(12) United States Patent
Fujiwara (10) Patent No.: US 8,363,693 B2
(45) Date of Patent: Jan. 29, 2013

(54) ADAPTIVE FREQUENCY HOPPING IN TIME-SLOTTED BASED WIRELESS NETWORK

(75) Inventor: Ryosuke Fujiwara, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 315 days.

(21) Appl. No.: 12/761,676

(22) Filed: Apr. 16, 2010

(65) Prior Publication Data

US 2011/0255570 A1    Oct. 20, 2011

(51) Int. Cl.
H04B 1/00 (2006.01)
(52) U.S. Cl. .......................... 375/131; 375/132; 375/138
(58) Field of Classification Search .......... 375/131–133, 375/138
See application file for complete search history.

(56) References Cited

U.S. PATENT DOCUMENTS

| | | |
|---|---|---|
| 7,035,314 B1 | 4/2006 | Linsky |
| 2005/0008064 A1 | 1/2005 | Hammes et al. |
| 2007/0183338 A1* | 8/2007 | Singh et al. .................. 370/252 |
| 2009/0185601 A1 | 7/2009 | Felbecker et al. |

OTHER PUBLICATIONS

ISA100.11a-2009, An ISA standard, Wireless systems for industrial automation: Process control and related applications, Oct. 2009.

* cited by examiner

*Primary Examiner* — Curtis Odom
(74) *Attorney, Agent, or Firm* — Mattingly & Malur, PC

(57) ABSTRACT

In a wireless network system, the nodes share a frequency hopping pattern. A method comprises providing a channel list table which includes, for each transmitting node, one or more channel lists, each channel list containing conditions of the channels of the shared frequency hopping pattern that include at least one available channel for communications with a target node; selecting a channel of a next allocated time slot from the shared frequency hopping pattern at the transmitting node; selecting the channel list for the target node from the channel list table, to which the transmitting node transmits; checking if the selected channel is available based on the selected channel list; setting the selected channel at the transmitting node if the selected channel is available; and calculating a substitute channel from the channel list if the selected channel is not available.

20 Claims, 6 Drawing Sheets

M: Measurement timeslot

| Target | ID | 0 | 1 | 2 | 3 | 4 | 5 |
|---|---|---|---|---|---|---|---|
| AP | 0 | Bad | Bad | Bad | Good | Good | Good |
| Node #2 | 2 | Good | Good | Bad | Good | Good | Good |
| Node #3 | 3 | Good | Good | Bad | Good | Good | Good |
| | | | | | | | |
| | | | | | | | |

|  | Item | 0 | 1 | 2 | 3 | 4 | 5 |
|---|---|---|---|---|---|---|---|
| Measurement results | PER(#1) | Bad | Bad | Bad | Good | Bad | Good |
|  | PER(#2) | Bad | Bad | Bad | Good | Good | Good |
|  | CCA | Bad | Bad | Bad | Good | Good | Good |
| Channel lists | For node#1 | Bad | Bad | Bad | Good | Bad | Good |
|  | For node#2 | Bad | Bad | Bad | Good | Good | Good |

|  | Frame #1 | | | | | Frame #2 | | | | | Frame #3 | | | | |
|---|---|---|---|---|---|---|---|---|---|---|---|---|---|---|---|
| Allocated link | A | B | C | D | M | A | B | C | D | M | A | B | C | D | M |
| Shared hopping pattern (Main) | 0 | 1 | 2 | 3 | 4 | 5 | 0 | 1 | 2 | 3 | 4 | 5 | 0 | 1 | 2 |
| Shared hopping pattern (Sub) | 1 | 2 | 3 | 4 | 5 | 0 | 1 | 2 | 3 | 4 | 5 | 0 | 1 | 2 | 3 |

ADAPTIVE FREQUENCY HOPPING IN TIME-SLOTTED BASED WIRELESS NETWORK

BACKGROUND OF THE INVENTION

The present invention relates generally to wireless networks and, more particularly, to adaptive frequency hopping in a time-slotted based wireless network.

Existing industrial wireless systems such as ISA100.11a or WirelessHART enable reliable wireless communications with time-slotted frequency hopping approach and mesh network technology. However, they could receive large impacts of interferences from other wireless systems such as WiFi or Bluetooth because they use the same 2.4-GHz frequency band. The impact from WiFi interference is the most significant because WiFi uses broadband signals. To mitigate the impacts of interference from such other radio systems, the adaptive frequency hopping (AFH) approach has been proposed to dynamically change transmitting frequency channels based on measured channel conditions.

When AFH is applied for such industrial wireless systems, however, the following problems arise. The first problem relates to the application for a large scale wireless network. As the communication range is relatively large and there are many nodes which communicate with each other in the system, available channels at each node are different. This leads to large network complexity and large memory size in each device because each transceiver must have every frequency hopping pattern. The second problem relates to reliable and rapid interference detection. Interferences should be detected statistically for reliable measurements. As such, large measurement time will be required in order to qualify channel conditions. This means that when the interference is dramatically increasing, the network performance will degrade.

BRIEF SUMMARY OF THE INVENTION

Exemplary embodiments of the invention provide a distributed adaptive frequency hopping system which is suitable for large scale networks with less cost and less complexity to enable reliable communication. In specific embodiments, a frequency hopping pattern is shared among nodes in the system and a channel list is shared between each two nodes which communicate with each other. When a transmitter tries to transmit a packet to a receiver at the allocated time slot at the allocated channel of the shared frequency hopping pattern, if the channel is a bad channel, the transmitter changes the transmitted channel to a substitute channel selected from the shared channel list for the receiver. The receiver waits for the packet at a channel selected in the same manner. Furthermore, in order to know channel conditions, both error-rate-based measurement and CCA (clear channel assessment) based measurement are utilized. Space occupancies of interference signals are measured using the CCA mechanism. A time slot is allocated for CCA measurements to detect interferences. In the time slot, no nodes transmit data. Then, in the time slot, nodes in the system measure strengths of interference signals through all the channels of the frequency hopping pattern and compare them with a predetermined threshold. Through several measurements, the nodes judge the channel conditions by counting the number of the measurements whose strength is greater than the threshold. Therefore, the adaptive frequency channel mechanism which improves the reliability can be implemented into time-slotted frequency hopping based network and mesh network with less cost and less complexity.

An aspect of the present invention is directed to a wireless network system having a plurality of nodes, which include a transmitting node and a target node that communicate with each other, and which share a frequency hopping pattern among the plurality of nodes, the shared frequency hopping pattern including channels associated with a series of time slots, the time slots each having an allocated link between two of the nodes. A method comprises providing a channel list table which includes, for each transmitting node, one or more channel lists, each channel list containing conditions of the channels of the shared frequency hopping pattern that include at least one available channel for communications with a target node; selecting a channel of a next allocated time slot from the shared frequency hopping pattern at the transmitting node; selecting the channel list for the target node from the channel list table, to which the transmitting node transmits; checking if the selected channel is available based on the selected channel list; setting the selected channel at the transmitting node if the selected channel is available; and calculating a substitute channel from the channel list in place of the selected channel at the transmitting node if the selected channel is not available.

In some embodiments, the method further comprises waiting for the next allocated time slot to arrive; and transmitting data from the transmitting node to the target node at the next allocated time slot. The time slots for the shared frequency hopping pattern are arranged in a series of frames, each frame having a frame number and including a plurality of the time slots; and calculating the substitute channel comprises selecting a substitute channel from an available channel list which is made from the selected channel list. Selecting the substitute channel comprises calculating an address of the substitute channel from a frame number (x), a period of the shared frequency hopping pattern (y), and a length of an available channel list (N) which is a list of N available channels, according to $F(x,y)=[x/y]+\mod(x,y)$, where $[a]$ is a maximum integer that does not exceed "a," and $\mod(x,y)$ is a remainder of x divided by y. The available channel list includes only channels that are good channels.

In specific embodiments, the channel lists are created by qualifying the channels based on error-rate-based measurements and space occupancy measurements. The error-rate-based measurements are made when data is transmitted to obtain error rates for the channels. The space occupancy measurements are made at time slots when no data transmission link is allocated, each node conducting one or more channel clear assessment (CCA) through all channels in the shared frequency hopping pattern to count a number that the CCA is busy per each channel, so as to obtain a statistical metric of interference involving space occupancy for the channels. A channel is a bad channel if one or both of the error-rate-based measurements and the space occupancy measurements for the channel indicate that the channel is bad, and a channel is a good channel otherwise. The error rates are selected from the group consisting of packet error rate, bit error rate, and link quality indicator. The CCA is busy if a measured radio signal strength indicator (RSSI) is greater than a threshold value, which is one of a preset fixed threshold value or a variable threshold value that varies depending on a received signal power from transmitters that try to communicate with a receiver of the node conducting the CCA.

Another aspect of the invention is directed to a transmitting node in a wireless network system having a plurality of nodes, which include the transmitting node and a target node that communicate with each other. The transmitting node comprises a main transceiver having a main transmitter and a main receiver, and a controller which has a channel list table that includes, for each transmitting node, one or more channel lists. Each channel list contains conditions of the channels of the shared frequency hopping pattern that include at least one available channel for communications with a target node. The main transceiver shares a frequency hopping pattern with main transceivers of other nodes, the shared frequency hopping pattern including channels associated with a series of time slots, the time slots each having an allocated link between two of the nodes. The controller includes a channel setting module that is configured to select a channel of a next allocated time slot from the shared frequency hopping pattern for the main transceiver at the transmitting node; select the channel list for the target node from the channel list table, to which the transmitting node transmits via the main transmitter; check if the selected channel is available based on the selected channel list for the main transmitter; set the selected channel for the main transmitter at the transmitting node if the selected channel is available; and calculate a substitute channel from the channel list in place of the selected channel for the main transmitter at the transmitting node if the selected channel is not available.

In some embodiments, the transmitting node further comprises a sub-transceiver including a sub-transmitter and a sub-receiver. The main transceiver shares the shared frequency hopping pattern with main transceivers of other nodes in the system. The sub-transceiver shares an offset frequency hopping pattern with sub-transceivers of other nodes in the system, the offset frequency hopping pattern being offset from the shared frequency hopping pattern of the main transceiver. The main transceiver and the sub-transceiver transmit same data at different channels and receive same data at different channels. The channel-setting module of the controller is configured to select a channel of a next allocated time slot from the offset frequency hopping pattern for the sub-transceiver at the transmitting node; select the channel list for the target node from the channel list table, to which the transmitting node transmits via the sub-transmitter; check if the selected channel from the offset frequency hopping pattern is available based on the selected channel list for the sub-transmitter; set the selected channel for the sub-transmitter at the transmitting node if the selected channel is available; and calculate a substitute channel from the channel list in place of the selected channel for the sub-transmitter at the transmitting node if the selected channel is not available. The sub-transmitter waits for the next allocated time slot to arrive, and transmits data from the transmitting node to the target node at the next allocated time slot.

Another aspect of the invention is directed to a transmitting node in a wireless network system having a plurality of nodes, which include the transmitting node and a target node that communicate with each other. The transmitting node comprises a plurality of transceivers each having a transmitter and a receiver, and a controller which has a channel list table that includes, for each transmitting node, one or more channel lists. Each channel list contains conditions of the channels of the shared frequency hopping pattern that include at least one available channel for communications with a target node. The transceivers each share a frequency hopping pattern with corresponding transceivers of other nodes, the shared frequency hopping pattern including channels associated with a series of time slots, the time slots each having an allocated link between two of the nodes. The controller includes a channel setting module that is configured to select a channel of a next allocated time slot from the shared frequency hopping pattern for one transceiver of the plurality of transceivers which has the one transmitter at the transmitting node; select the channel list for the target node from the channel list table, to which the transmitting node transmits via the one transmitter; check if the selected channel is available based on the selected channel list for the one transmitter; set the selected channel for the one transmitter at the transmitting node if the selected channel is available; and calculate a substitute channel from the channel list in place of the selected channel for the one transmitter at the transmitting node if the selected channel is not available. The plurality of transceivers have frequency hopping patterns that are offset from each other. The transceivers transmit the same data at different channels and receive same data at different channels.

These and other features and advantages of the present invention will become apparent to those of ordinary skill in the art in view of the following detailed description of the specific embodiments.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for distributed adaptive frequency hopping which is suitable for large scale networks with less cost and less complexity to enable reliable communication.

Brief Tutorial of ISA100.11a System

Figure 1:
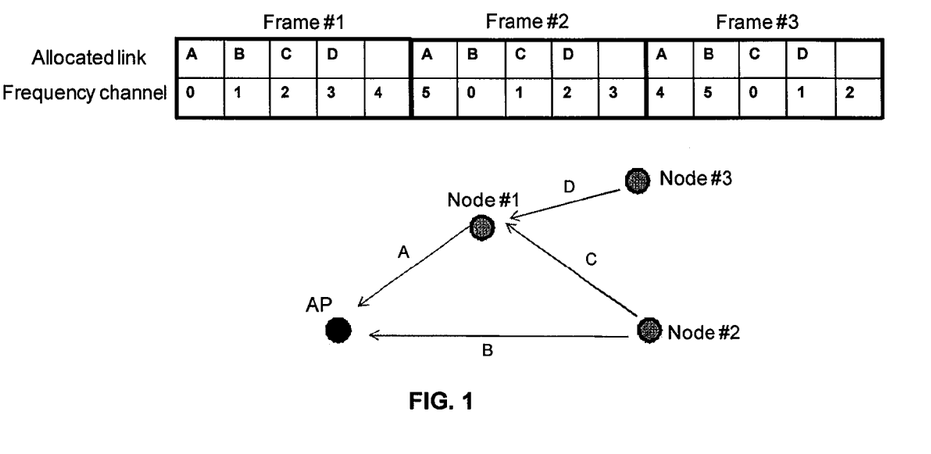
FIG. 1 illustrates an example of time-slotted channel hopping allocation with simplified frame structure and hopping pattern.

ISA100.11a specifies a wireless system for process control and related applications and it conducts through the OSI reference model. In this standard, the time-slotted channel hopping mechanism on mesh network is adopted as the data link layer. In such a mechanism, each link between two nodes is allocated with a time slot. Furthermore, a frequency channel for transmission is hopped by one timeslot as shown in FIG. 1 as an example. For easiness of explanation of the time-slotted channel hopping concept, the frame structure and the hopping pattern in FIG. 1 are simplified. The upper table shows the frame structure in which each frame includes 5 timeslots. The first row shows allocated links to each time slot and the second row shows frequency channels for the transmissions. This example uses the shared frequency hopping pattern of $\{0,1,2,3,4,5\}$. In this case, a hopping pattern for communications from the node #1 to the access point (AP), namely link A, should be $\{0,5,4,3,2,1\}$. The system may also utilize multiple-frame structure with another frequency hopping pattern which has an offset from the original hopping pattern. In such a system, multiple communications in a timeslot without any contention are possible. This system can receive a significant impact of interference from another wireless system which has the same frequency band such as a WiFi system. See ISA100.11a-2009, An ISA standard, Wireless systems for industrial automation: Process control and related applications, October 2009.

Adaptive Frequency Hopping for Bluetooth

Figure 2:
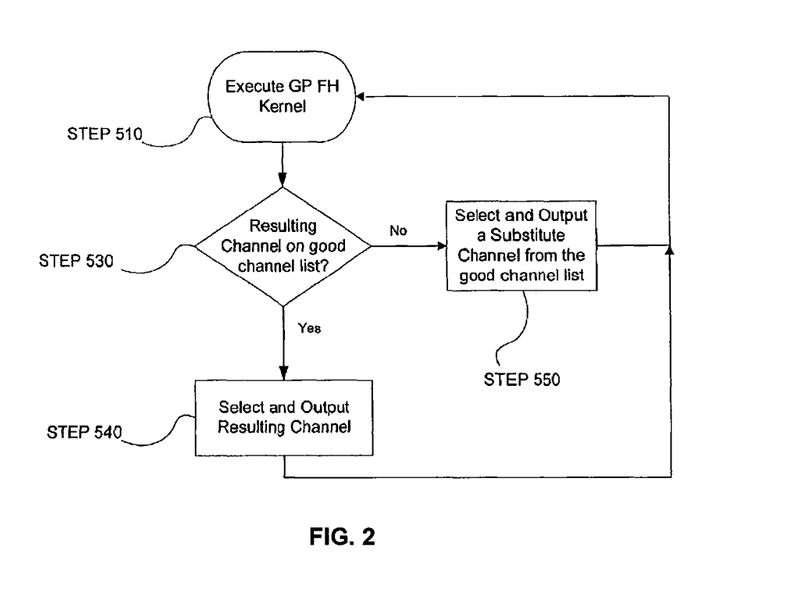
FIG. 2 is a flow diagram of the operation of an adaptive frequency hopping system for Bluetooth.

An overlay adaptive frequency hopping approach is disclosed in U.S. Pat. No. 7,035,314, especially for the Bluetooth system. The concept is that if the initially selected hopping frequency has bad channel condition characteristics, the kernel maps the initially selected hopping frequency to a substitute hopping frequency having good channel condition characteristics. FIG. 2 is a flow diagram of the operation of an adaptive frequency hopping system for Bluetooth in U.S. Pat. No. 7,035,314. It involves executing GP FH kernel (step 510) and determining whether the resulting channel is on the good channel list (step 530). If yes, the system selects and outputs the resulting channel (step 540). If no, the system selects and outputs a substitute channel from the good channel list (step 550). However, this mechanism is basically for point-to-point communication; no mechanisms for time division multiple access system or whole network management of adaptive frequency hopping are disclosed. That is, in industrial wireless systems which adopt time slotted frequency hopping as previously explained, systems with only this mechanism do not work because multiple nodes communicate within one frequency hopping sequence so that channel conditions are different for each node. Thus, U.S. Pat. No. 7,035,314 fails to disclose necessary mechanisms to treat such multiple nodes with different channel conditions in large scale networks.

Qualification and Selection of Frequency Channels

For the qualification and selection of frequency channels for adaptive frequency hopping, a mechanism to measure channel conditions is required. In U.S. Patent Application Publication No. 2005/0008064, a method with RSSI (Radio Signal Strength Indicator) measurement is disclosed. Additionally, a combination use of RSSI measurement and packet/bit error rate measurement is disclosed. Considering interference signals such as WiFi signals, statistical measurements such as space occupancies are more important because wireless signals are not always generated to the air. In this sense, the packet error rate is an appropriate metric for channel qualification. However, it tends to take a long time to gather enough samples of measurements all over the channels to qualify the channels in such systems. That leads to performance degradation when a drastic change of interference condition occurs.

A. Adaptive Frequency Hopping in Time-Slotted Based Wireless Network

Figure 3:
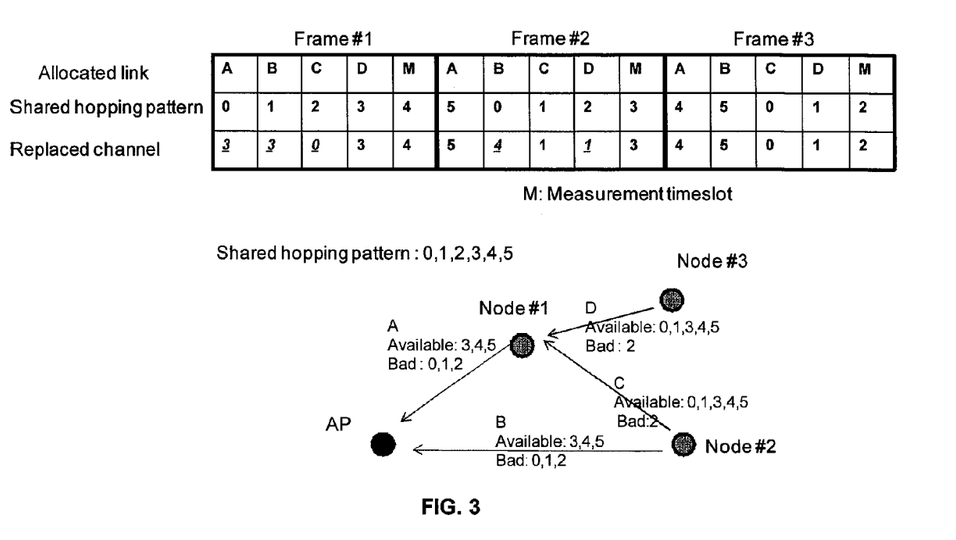
FIG. 3 shows an example of the adaptive frequency hopping in a time-slotted based network according to an embodiment of the present invention.

To address the above issues, we propose a distributed adaptive frequency hopping network. FIG. 3 shows an example of the adaptive frequency hopping in a time-slotted based network according to an embodiment of the present invention, which is a modified version of FIG. 1. All the nodes and AP (access point) have shared super frames as explained previously. Furthermore, all the nodes and AP share a frequency hopping pattern for a super frame structure. The shared hopping pattern of the example of FIG. 3 is {0,1,2,3,4,5}.

The channel lists for each link are also shown in FIG. 3. For example, the link A has an available channel list of {3,4,5} and a bad channel list of {0,1,2} as measurement results. These lists are shared between the related communicators of the link A, which are node#1 and the AP. In the first time slot of Frame #1, the shared hopping channel is 0, which is in the bad channel list of link A. As such, the node #1 transmits data at the channel 3 selected from the available channel list instead of the channel 0. The AP also selected the channel 3 from the available channel list in the same manner. In the fourth timeslots of the Frame #1, the shared hopping channel is 3, which is not in the bad channel list of the link D. In this case, the node #3 transmits data at the channel 3 and the node #1 waits for the data at the same channel. Thus, the same process is done for every link.

Different from this example, the available channel lists may not necessarily include only good channels. It means they may include bad channels. If bad channels are included, the node can know the changing condition of the bad channels and then the node can reuse a bad channel if it becomes good condition.

Figure 4:
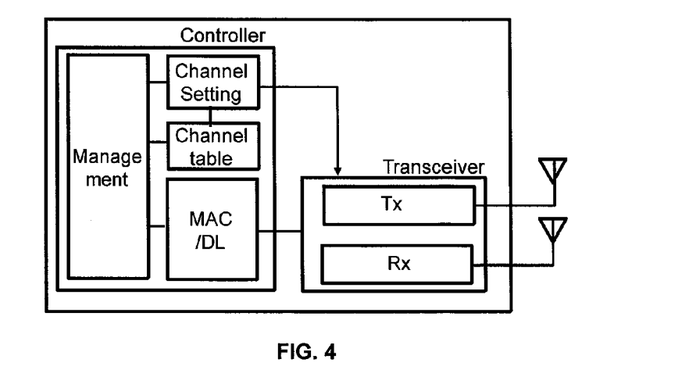
FIG. 4 shows a diagram of a communicating device which is included by nodes or access point according to an embodiment of the present invention.

B. Apparatus for Adaptive Frequency Hopping in Time-Slotted Based Wireless Network 1) Communicating Device FIG. 4 shows a diagram of a communicating device which is included by nodes or access point according to an embodiment of the present invention. Each block in the diagram of FIG. 4 is a functional unit of the wireless communicating device adopted to perform the distributed adaptive frequency hopping of the present invention. The communicating device includes a transceiver and a controller. The transceiver includes a transmitter (Tx) and a receiver (Rx) for transmitting wireless signals to the air and receiving wireless signals from the air. The transceiver is configured by the controller in terms of a frequency channel for transmission or reception.

Figure 5:
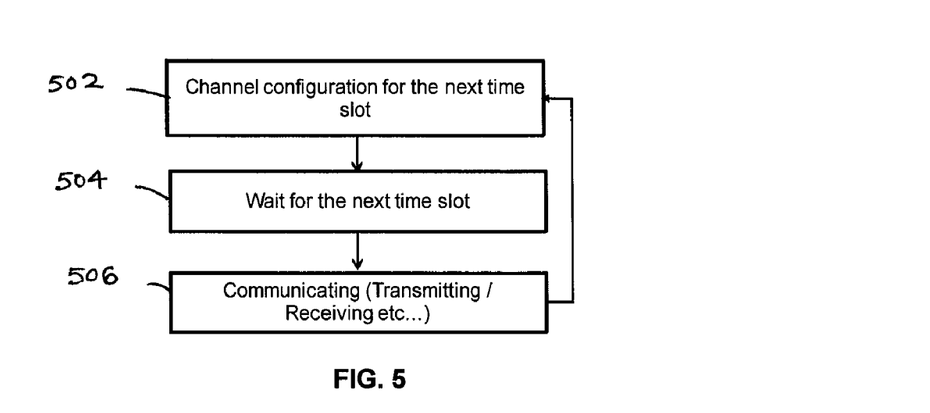
FIG. 5 is a flow diagram illustrating a typical communication flow in the communicating device of FIG. 4.

The controller includes a management module, a channel setting module, a channel table, and a MAC/DL module. The MAC/DL function in the controller handles a medium access control layer and upper layer of the wireless link. The management function is responsible for configurations and management over all the communications. A typical communication flow in the communicating device is shown in FIG. 5. At first, configurations for the next allocated time slot are processed in step 502. The details of this function will be explained later. In step 504, the device waits for the next allocated time slot. When the allocated time slot comes in step 506, the device tries to transmit data if any or waits for data transmitted by other node. Once all communications are done in the time slot, a channel configuration for the next allocated time slot is processed again. The controller also has the channel setting function and the channel table. The channel table includes at least shared frequency hopping patterns and channel lists for several nodes with which the controller's own device can communicate. The channel lists include channel condition information.

Figure 6:
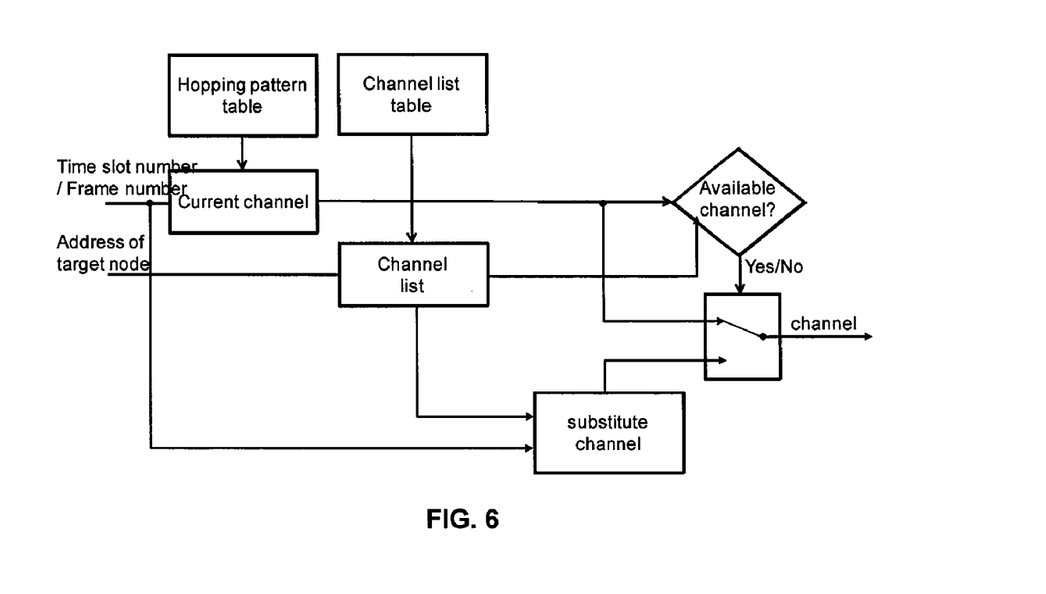
FIG. 6 shows an example of the structure of the channel setting function in the communicating device of FIG. 4.
Figure 7:
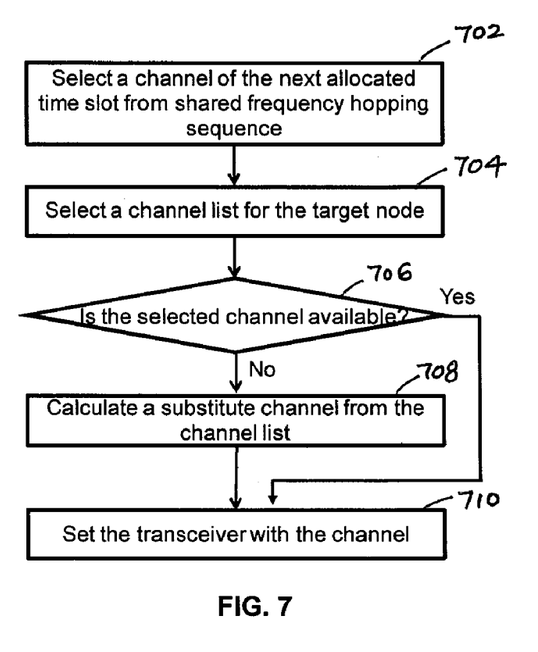
FIG. 7 shows an example of a flowchart of the channel setting function.

An example of the structure of the channel setting function in the communicating device of FIG. 4 is shown in FIG. 6. FIG. 7 shows an example of a flowchart of the channel setting function, which corresponds to the step 502 of configurations for the next allocated time slot in FIG. 5. In step 702, the current communicating frequency channel is loaded for the next allocated timeslot from the shared frequency hopping pattern which is in the channel table. This is represented by the "current channel" block in FIG. 6 having as input the time slot number and frame number and the hopping pattern table. In step 704, the channel list for the target node to which the controller's own device tries to communicate is loaded from the channel table. This is represented by the "channel list" block in FIG. 6 having as input the address of the target node and a channel list table.

Figure 8:
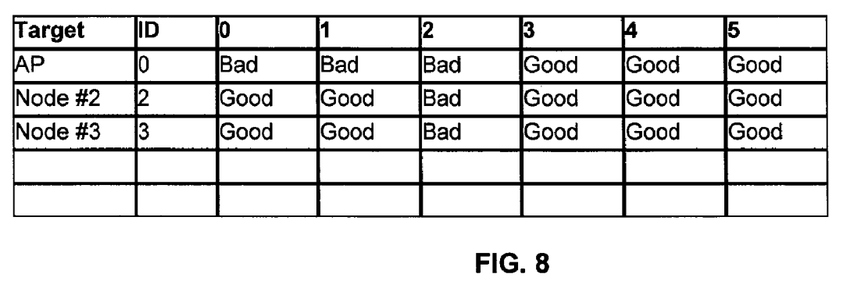
FIG. 8 shows an example of a channel list table.

FIG. 8 shows an example of a channel list table. In FIG. 8, only the channel lists for node #1 for the example in FIG. 3 are shown. A more complete table will show channel lists for the other nodes as well. The table shows three channel lists respectively for targets AP, node #2, and node #3. Each channel list has a plurality of channels with qualification of "good" or "bad" for each channel on the list. The qualification of the channels is discussed below.

Returning to FIG. 7, if the current channel is not available according to the channel list as determined in step 706 ("available channel?" block in FIG. 6), a substitute channel is selected from an available channel list in step 708. Generally, the available channel list is made from the channel list. This is represented by the "substitute channel" block in FIG. 6 having as input the time slot number and frame number and the channel list. If the current channel is available as determined in step 706, the substitute channel calculation step 708 is skipped. Then the selected channel is set to the transceiver in step 710.

2) Examples of Substitute Channel

Figure 9:
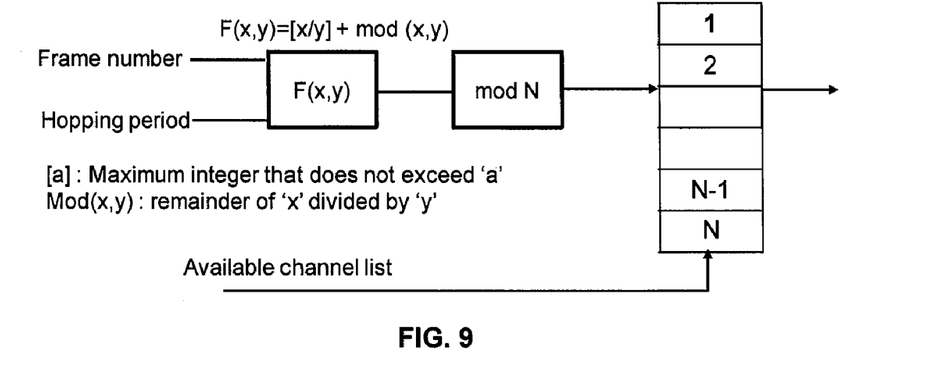
FIG. 9 shows an example of a substitute channel calculation.

This section explains examples of a substitute channel calculation. FIG. 9 shows one such example. A substitute channel is selected from the available channel list as explained previously. An example of selecting manners is to utilize frame number information. As seen in FIG. 9, the calculator selects a substitute channel with an address calculated from the frame number and the period of the shared frequency hopping pattern and the length of the available channel list.

There are also some examples of the available channel list. One of them is a list which includes only channels with good conditions. Another example of the available channel list is a list which is the same as the shared frequency hopping pattern. This example leads to the use of "bad" channels. However, the number of opportunities to use bad channels is still reduced and instead the device can get opportunities to measure the error rate at the channel. Furthermore, in the system of this example, when a multiple-frame structure with another frequency hopping pattern which has an offset from the original pattern is conducted, multiple communications in each slot without any contention is possible if the available channel lists also have an offset from other frame-structure's frequency hopping patterns. For example, when the shared frequency hopping pattern of the first frame structure is {0,1,2,3,4,5} and the shared frequency hopping pattern of the second frame structure is {1,2,3,4,5,0} which means an offset of 1, there will be no collision if the available channel list is {0,1, 2,3,4,5} for the first frame structure and the available channel list is {1,2,3,4,5,0} for the second frame structure which also has an offset of 1.

C. Qualification and Selection of Channels

The qualification and selection method in AFH systems is a key feature. The present invention proposes a combination use of error-rate-based measurements and space occupancy measurements by counting the number of busy CCAs. The error-rate-based measurements are done when packets are transmitted. However, the number of opportunities to transmit or receive packets at a certain channel is relatively small because of the frequency hopping mechanism. That leads to large measurement time to get channel characteristics and then performance degradation can occur under dynamic changing interference conditions. Then, space occupancy measurements with CCA mechanism complement this weak point of the error-rate-based measurements. FIG. 3 shows this concept. In FIG. 3, the fifth time slot in each frame is allocated as a CCA measurement period. In this slot, no one tries to transmit data, so that all the nodes can measure only interference conditions. In this slot, each node conducts CCA through all channels in the shared frequency hopping pattern. Typically, the mode of the CCA is ED (energy detection) which measures RSSI (Radio Signal Strength Indicator). By repeating this measurement and counting the number that CCA is busy per each channel, the statistical metric of the interference such as space occupancies is obtained for qualification of the channels. For example, in the case where the number of busy CCAs during a predetermined period at a certain channel exceeds a predetermined value, the channel can be qualified as a bad channel.

A condition that CCA is busy is generally determined by comparing measured RSSI with a predetermined threshold value. That is, if the measured RRSI is greater than the threshold value, the CCA is busy. The threshold value may be a fixed value determined in advance. Also, the threshold value may be variable based on the received signal power from transmitters that try to communicate with the receiver.

Figure 10:
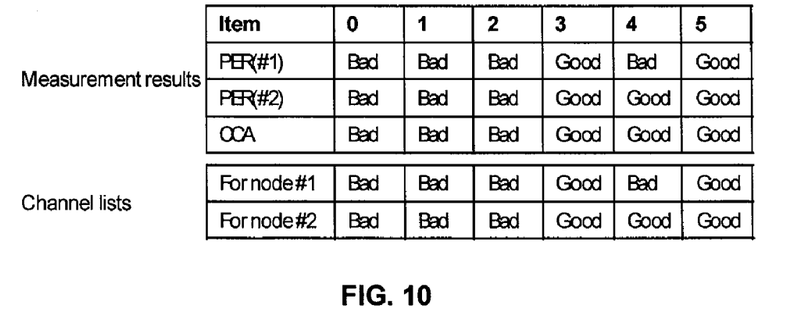
FIG. 10 shows an example of measurement results and channel qualification.

In the error-rate-based measurements, typically packet error rates (PER) are measured. Considering both results of PER and CCA, the final channel qualification is conducted as shown in an example of FIG. 10. This figure shows the measurement results of the AP and channel lists for the node #1 and the node #2. In this example, the channel lists for the nodes are different from each other. Additionally, the bit error rate (BER) measurement or LQI (Link quality indicator) measurement may be used as the error-rate-based measurement.

D. Channel List Notification

In order to share a channel list between two nodes, the channel list must be notified from one to the other. Detail sequences to notify the channel list are known in the art and will not be described here, but some examples are shown in this section for illustrative purposes.

One idea is to insert the future channel list into data packets or ACK/NACK packets with information of effective time. Another idea is to negotiate with each other to share the future channel list. For example, the receiver with a channel list which has been changed transmits packet with the notification to the transmitter. Once the transmitter receives the information, it transmits the acknowledgement of the notification. Another idea is that a system manager gathers measurement results of all the nodes in the system and makes channel lists for all the links. Then, the system manager notifies the channel lists to all the nodes.

E. Multi-Channel Embodiment

Figure 11:
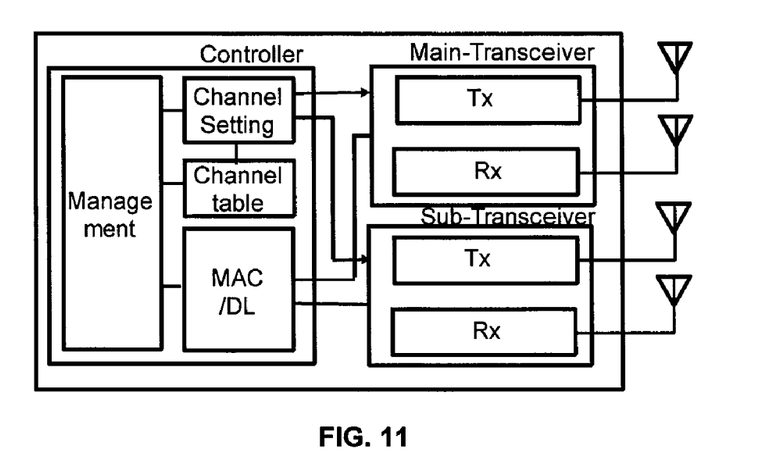
FIG. 11 shows a multi-channel communicating node according to an embodiment of the invention.

In order to improve the reliability further, the multi-channel communication concept can be used. FIG. 11 shows an embodiment of the proposed multi-channel communicating node. It includes two or more transceivers. Both the transceivers transmit the same data at different channels and they receive the same data at the different channels.

Figure 12:
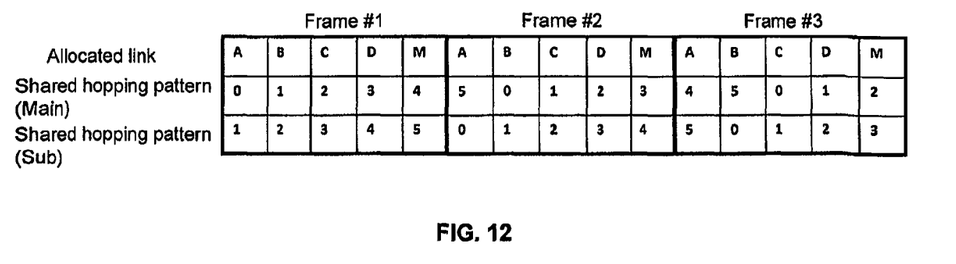
FIG. 12 shows an example of the multi-channel frequency hopping patterns.

FIG. 12 shows an example of the multi-channel frequency hopping patterns. The frequency hopping pattern for the sub-transceiver has an offset from one for the main-transceiver. For ease of explanation, this figure does not include the AFH operation. With the AFH operation, the mechanism presented previously can be applied to either or both transceivers. By using this multi-channel concept, the reliability can be drastically improved at the cost of transceiver simplicity.

Figure 13:
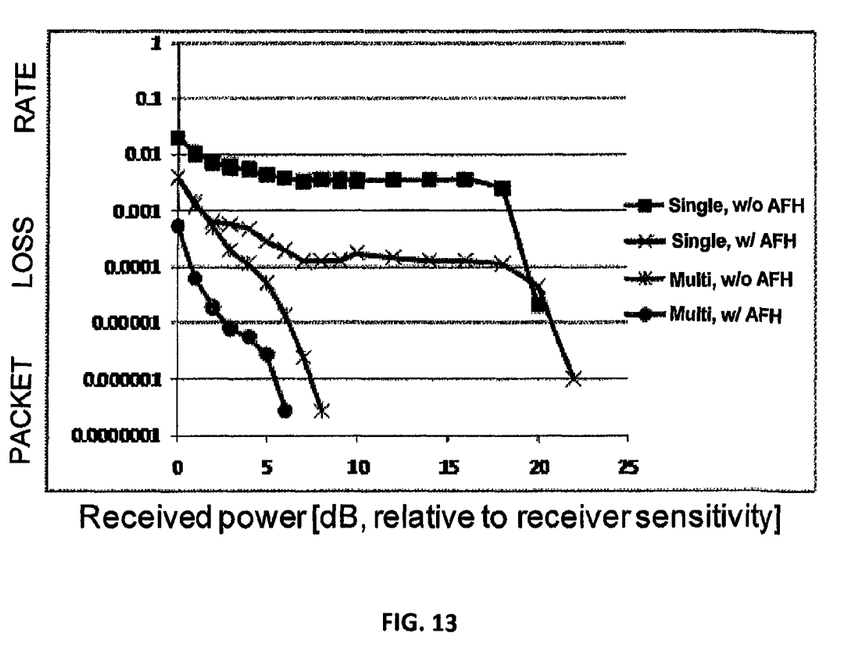
FIG. 13 shows simulation results under a certain interference condition illustrating the effect of the proposed adaptive frequency hopping (AFH) and the effect of multi-channel communication with the AFH.

The effect of the proposed AFH and the effect of multi-channel communication with the AFH are shown in FIG. 13 which plots the simulation results under a certain interference condition. The packet loss rate drops when AFH is used for the single channel example and when the AFH is used for the multi-channel example.

F. Benefits of the Invention

The present invention provide adaptive frequency hopping mechanism for large scale networks with less cost and less complexity to enable reliable communication. In one embodiment, nodes in a network share one or more frequency hopping patterns and two nodes which try to communicate each other share a channel list which includes channel conditions. Two main benefits of the present invention are improved reliability and rapid measurements. The adaptive frequency channel mechanism which improves the reliability can be implemented into time-slotted frequency hopping based network and mesh network with less cost and less complexity. The improvement in reliability is shown in FIG. 13. Furthermore, reliable and rapid measurements of channel conditions can be realized, for instance, by the combination use of the error-rate-based measurements and the space occupancy measurements for the qualification and selection of channels as discussed above.

Wireless systems according to the present invention can be used for industrial wireless applications which require reliability such as plant/factory automation, building automation, environmental monitoring and so on. One of the typical applications is monitoring application. In typical monitoring applications, terminal nodes have sensors and the proposed transceiver. They send measured data to a center. Another application is control application. In typical control applications, terminal nodes also have actuators which are controlled by signals transmitted via wireless communications.

The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for adaptive frequency hopping in a time-slotted based wireless network. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. In a wireless network system having a plurality of nodes, which include a transmitting node and a target node that communicate with each other, and which share a frequency hopping pattern among the plurality of nodes, the shared frequency hopping pattern including channels associated with a series of time slots, the time slots each having an allocated link between two of the nodes, a method comprising:
providing a channel list table which includes, for each transmitting node, one or more channel lists, each channel list containing conditions of the channels of the shared frequency hopping pattern that include at least one available channel for communications with a target node;
selecting a channel of a next allocated time slot from the shared frequency hopping pattern at the transmitting node;
selecting the channel list for the target node from the channel list table, to which the transmitting node transmits;
checking if the selected channel is available based on the selected channel list;
setting the selected channel at the transmitting node if the selected channel is available; and
calculating a substitute channel from the channel list in place of the selected channel at the transmitting node if the selected channel is not available.

2. The method according to claim 1, further comprising:
waiting for the next allocated time slot to arrive; and
transmitting data from the transmitting node to the target node at the next allocated time slot.

3. The method according to claim 1,
wherein the time slots for the shared frequency hopping pattern are arranged in a series of frames, each frame having a frame number and including a plurality of the time slots; and
wherein calculating the substitute channel comprises selecting a substitute channel from an available channel list which is made from the selected channel list.

4. The method according to claim 3,
wherein selecting the substitute channel comprises calculating an address of the substitute channel from a frame number (x), a period of the shared frequency hopping pattern (y), and a length of an available channel list (N) which is a list of N available channels, according to $F(x,y)=[x/y]+mod(x,y)$, where $[a]$ is a maximum integer that does not exceed "a," and $mod(x,y)$ is a remainder of x divided by y.

5. The method according to claim 3,
wherein the available channel list includes only channels that are good channels.

6. The method according to claim 1,
wherein the channel lists are created by qualifying the channels based on error-rate-based measurements and space occupancy measurements;
wherein the error-rate-based measurements are made when data is transmitted to obtain error rates for the channels;
wherein the space occupancy measurements are made at time slots when no data transmission link is allocated, each node conducting one or more channel clear assessment (CCA) through all channels in the shared frequency hopping pattern to count a number that the CCA is busy per each channel, so as to obtain a statistical metric of interference involving space occupancy for the channels; and
wherein a channel is a bad channel if one or both of the error-rate-based measurements and the space occupancy measurements for the channel indicate that the channel is bad, and a channel is a good channel otherwise.

7. The method according to claim 6,
wherein the error rates are selected from the group consisting of packet error rate, bit error rate, and link quality indicator.

8. The method according to claim 6,
wherein the CCA is busy if a measured radio signal strength indicator (RSSI) is greater than a threshold value, which is one of a preset fixed threshold value or a variable threshold value that varies depending on a received signal power from transmitters that try to communicate with a receiver of the node conducting the CCA.

9. A transmitting node in a wireless network system having a plurality of nodes, which include the transmitting node and a target node that communicate with each other, the transmitting node comprising a main transceiver having a main transmitter and a main receiver, and a controller which has a channel list table that includes, for each transmitting node, one or more channel lists, each channel list containing conditions of the channels of the shared frequency hopping pattern that include at least one available channel for communications with a target node; the main transceiver sharing a frequency hopping pattern with main transceivers of other nodes, the shared frequency hopping pattern including channels associated with a series of time slots, the time slots each having an allocated link between two of the nodes; wherein the controller includes a channel setting module that is configured to:
  select a channel of a next allocated time slot from the shared frequency hopping pattern for the main transceiver at the transmitting node;
  select the channel list for the target node from the channel list table, to which the transmitting node transmits via the main transmitter;
  check if the selected channel is available based on the selected channel list for the main transmitter;
  set the selected channel for the main transmitter at the transmitting node if the selected channel is available; and
  calculate a substitute channel from the channel list in place of the selected channel for the main transmitter at the transmitting node if the selected channel is not available.

10. The transmitting node according to claim 9,
  wherein the time slots for the shared frequency hopping pattern are arranged in a series of frames, each frame having a frame number and including a plurality of the time slots; and
  wherein calculating the substitute channel comprises selecting a substitute channel from an available channel list which is made from the selected channel list.

11. The transmitting node according to claim 10,
  wherein calculating the substitute channel comprises calculating an address of the substitute channel from a frame number (x), a period of the shared frequency hopping pattern (y), and a length of an available channel list (N) which is a list of N available channels, according to $F(x,y)=[x/y]+mod(x,y)$, where [a] is a maximum integer that does not exceed "a," and mod(x,y) is a remainder of x divided by y.

12. The transmitting node according to claim 10,
  wherein the available channel list which includes only channels that are good channels.

13. The transmitting node according to claim 9,
  wherein the channel list table is created by qualifying the channels based on error-rate-based measurements and space occupancy measurements;
  wherein the error-rate-based measurements are made when data is transmitted to obtain error rates for the channels;
  wherein the space occupancy measurements are made at time slots when no data transmission link is allocated, each node conducting one or more channel clear assessment (CCA) through all channels in the shared frequency hopping pattern to count a number that the CCA is busy per each channel, so as to obtain a statistical metric of interference involving space occupancy for the channels; and
  wherein a channel is a bad channel if one or both of the error-rate-based measurements and the space occupancy measurements for the channel indicate that the channel is bad, and a channel is a good channel otherwise.

14. The transmitting node according to claim 13,
  wherein the error rates are selected from the group consisting of packet error rate, bit error rate, and link quality indicator.

15. The transmitting node according to claim 13,
  wherein the CCA is busy if a measured radio signal strength indicator (RSSI) is greater than a threshold value, which is one of a preset fixed threshold value or a variable threshold value that varies depending on a received signal power from transmitters that try to communicate with a receiver of the node conducting the CCA.

16. The transmitting node according to claim 9, further comprising:
  a sub-transceiver including a sub-transmitter and a sub-receiver;
  wherein the main transceiver shares the shared frequency hopping pattern with main transceivers of other nodes in the system;
  wherein the sub-transceiver shares an offset frequency hopping pattern with sub-transceivers of other nodes in the system, the offset frequency hopping pattern being offset from the shared frequency hopping pattern of the main transceiver; and
  wherein the main transceiver and the sub-transceiver transmit same data at different channels and receive same data at different channels.

17. The transmitting node according to claim 16, wherein the channel-setting module of the controller is configured to:
  select a channel of a next allocated time slot from the offset frequency hopping pattern for the sub-transceiver at the transmitting node;
  select the channel list for the target node from the channel list table, to which the transmitting node transmits via the sub-transmitter;
  check if the selected channel from the offset frequency hopping pattern is available based on the selected channel list for the sub-transmitter;
  set the selected channel for the sub-transmitter at the transmitting node if the selected channel is available; and
  calculate a substitute channel from the channel list in place of the selected channel for the sub-transmitter at the transmitting node if the selected channel is not available.

18. The transmitting node according to claim 17,
  wherein the sub-transmitter waits for the next allocated time slot to arrive, and transmits data from the transmitting node to the target node at the next allocated time slot.

19. A transmitting node in a wireless network system having a plurality of nodes, which include the transmitting node and a target node that communicate with each other, the transmitting node comprising a plurality of transceivers each having a transmitter and a receiver, and a controller which has a channel list table that includes, for each transmitting node, one or more channel lists, each channel list containing conditions of the channels of the shared frequency hopping pattern that include at least one available channel for communications with a target node; the transceivers each sharing a frequency hopping pattern with corresponding transceivers of other nodes, the shared frequency hopping pattern including channels associated with a series of time slots, the time slots each having an allocated link between two of the nodes; wherein the controller includes a channel setting module that is configured to:
  select a channel of a next allocated time slot from the shared frequency hopping pattern for one transceiver of the plurality of transceivers which has the one transmitter at the transmitting node;
  select the channel list for the target node from the channel list table, to which the transmitting node transmits via the one transmitter;
  check if the selected channel is available based on the selected channel list for the one transmitter;

set the selected channel for the one transmitter at the transmitting node if the selected channel is available; and
calculate a substitute channel from the channel list in place of the selected channel for the one transmitter at the transmitting node if the selected channel is not available;
wherein the plurality of transceivers having frequency hopping patterns that are offset from each other; and
wherein the transceivers transmit same data at different channels and receive same data at different channels.

20. The transmitting node according to claim 19,
wherein each transmitter in the transmitting node waits for the next allocated time slot to arrive, and transmits data from the transmitting node to the target node at the next allocated time slot.

* * * * *